United States Patent
Vasilyev et al.

(10) Patent No.: US 9,116,846 B2
(45) Date of Patent: Aug. 25, 2015

(54) VIRTUAL MACHINE BACKUP FROM STORAGE SNAPSHOT

(71) Applicant: Veeam Software AG, Baar (CH)

(72) Inventors: Alexey Vasilyev, Saint-Petersburg (RU); Alexander Baranov, Saint-Petersburg (RU)

(73) Assignee: VEEAM SOFTWARE AG, BAAR (CH)

(*) Notice: Subject to any disclaimer, the term of this patent is extended or adjusted under 35 U.S.C. 154(b) by 158 days.

(21) Appl. No.: 13/914,086

(22) Filed: Jun. 10, 2013

(65) Prior Publication Data

US 2014/0365740 A1 Dec. 11, 2014

(51) Int. Cl.
*G06F 12/16* (2006.01)
*G06F 11/14* (2006.01)

(52) U.S. Cl.
CPC ........ *G06F 11/1451* (2013.01); *G06F 11/1456* (2013.01); *G06F 11/1458* (2013.01); *G06F 11/1484* (2013.01)

(58) Field of Classification Search
None
See application file for complete search history.

(56) References Cited

U.S. PATENT DOCUMENTS

| | | | |
|---|---|---|---|
| 8,060,476 B1 | 11/2011 | Afonso et al. | |
| 8,375,003 B1 | 2/2013 | Afonso et al. | |
| 8,566,542 B1 * | 10/2013 | Wang et al. | 711/162 |
| 2011/0010515 A1 * | 1/2011 | Ranade | 711/162 |
| 2011/0252208 A1 * | 10/2011 | Ali et al. | 711/162 |
| 2011/0307657 A1 | 12/2011 | Timashev et al. | |
| 2014/0095817 A1 * | 4/2014 | Hsu et al. | 711/162 |

FOREIGN PATENT DOCUMENTS

| | | |
|---|---|---|
| EP | 2580662 A2 | 4/2013 |
| WO | WO-2011159701 A2 | 12/2011 |

OTHER PUBLICATIONS

The Notification of Transmittal of the International Search Report and Written Opinion of the International Searching Authority issued in Int'l Patent Application No. PCT/IB2014/001645, 16 pages, mailed Jan. 22, 2015.

* cited by examiner

*Primary Examiner* — Gary Portka
(74) *Attorney, Agent, or Firm* — Sterne, Kessler, Goldstein & Fox, P.L.L.C.

(57) ABSTRACT

Disclosed herein are system, method, and computer program product embodiments for virtual machine (VM) backup from a storage snapshot. An embodiment operates by receiving selective backup parameters including a VM to backup and then creating a VM snapshot associated with the VM. Next, an offset table associated with a virtual disk of the VM stored on a storage is retrieved. The embodiment further includes generating a storage snapshot and deleting the VM snapshot and then promoting the storage snapshot to a new logical unit number. The promoted storage snapshot is then mounted to the backups server. The virtual disk data is backed up to a backup storage using the offset table from the storage snapshot. The storage snapshot is dismounted from the backup server and deleted from the storage.

21 Claims, 4 Drawing Sheets

VIRTUAL MACHINE BACKUP FROM STORAGE SNAPSHOT

BACKGROUND

Server virtualization has grown in popularity and importance as it provides a flexible way to configure server resources and allows for maximizing usage of server resources in a cost-effective manner. A very large company or a small business, as well as anything in between (including individual users), can utilize server virtualization in order to allocate an appropriate amount of server resources so as to ensure efficient use of server resources. The virtual server resources may be administered using a virtual machine (VM). While virtualization of server resources provides benefits, use of a VM also introduces complexities and challenges.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Figure 1A:
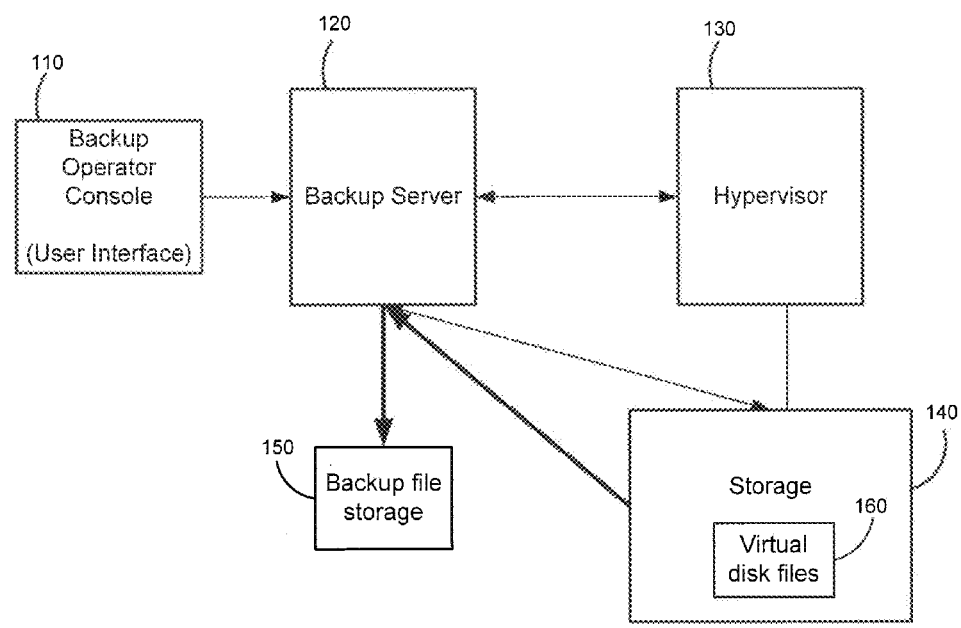
FIG. 1A is a block diagram of a VM system architecture configured for VM backup using a storage snapshot, according to an example embodiment.

Provided herein are system, method and/or computer program product embodiments, and/or combinations and subcombinations thereof, for VM backup from a storage snapshot.

In embodiments, backing up a VM involves usage of a hypervisor level snapshot, e.g., a software snapshot. Software snapshots are computationally expensive and may necessitate that the software snapshot be created at "off-hours" such as at a time when load on the VM is low. However, in many applications there are no "off-hours" for a corresponding VM (such applications include but are not limited to email servers, web servers, application servers, etc.). Thus, backing up a VM can be problematic for a VM that does not have a time when load on the VM is low. Use of a software snapshot to backup a VM with a high load may cause the VM to be non-responsive as described further below.

Software Snapshot

As provided above, it may be complex to backup a VM which is used to administer virtual server resources. According to some approaches, an image-level backup may be used to backup a VM. This may be accomplished by using a hypervisor snapshot of the VM. The hypervisor snapshot may be used to create a complete copy of the VM image for backup purposes. However, a hypervisor snapshot, i.e., a software snapshot, reduces the performance of a VM and associated host computing resources.

According to some approaches, when a VM snapshot is in the process of being created, data is not written to virtual disks associated with the VM. Instead, data is written to a snapshot file. Thus, it is possible to backup a static version of the virtual disks associated with the VM, and they will remain read-only during the backup process. When the backup is completed, the snapshot file will be removed. In one implementation, removal of this snapshot file includes consolidating the data in the snapshot file into the virtual disk. While this snapshot file is being committed to the virtual disk, an additional snapshot file is created in order to store data which is being written to the virtual disk during the commit. At the end of the commit, the VM needs to be "frozen" for a period of time in order to get the data from the additional snapshot file onto the virtual disk without creating an even further snapshot file. This is called a stun/unstun cycle.

A VM (such as but not limited to one having a high change rate) may create a very large snapshot file while a backup process is in the process of running. Thus, commit of the large snapshot file may require a significant amount of time and also involve a large number of related input/output operations. The commit process of a large snapshot file may have a negative effect on the performance of a VM. As an example, the user of the VM may be unable to login to servers which are being administered by the VM during snapshot commit. In addition, the VM may struggle to maintain network connections during snapshot removal. This is why in some approaches hypervisor snapshots are created during "off-hours" such as the middle of the night.

If hypervisor workload saturates input/output operations per second (IOPS) such that they are near maximum, it may be nearly impossible to delete a snapshot without causing a system to suffer adverse effects. In some implementations, read performance of disks associated with the VM may drop to approximately 5.5% of attainable read performance when the snapshot is enabled. In addition, committing a snapshot may have an even more severe impact upon performance. As an example, a target storage may average around 30-40% IOPS load for a busy SQL (Structured Query Language)/Exchange server. If snapshot removal is executed, IOPS may approach 80+% and may even be much higher. Storage may suffer a large latency penalty when IOPS is greater than 80% which will be largely detrimental to performance.

Hardware Snapshot

In some approaches, software snapshots suffer from a variety of performance issues as provided above. In embodiments, storage-based or hardware snapshots address a number of these performance issues. As an example, a storage device may take snapshots of its own storage volumes. When the snapshot is handled at the hardware level rather than the software level, the storage volume may maximize efficiency. As a result, hardware snapshot technologies do not suffer from the same performance issues that tend to plague software snapshots. However, in some approaches, hardware snapshots are limited by the following issues which have limited them from being used as a complete backup/recovery solution.

(1)—Hardware snapshots may not meet regulatory retention requirements. Organizations may utilize backups to retain data to satisfy regulatory requirements. Certain laws such as HIPAA (Health Insurance Portability and Accountability Act of 1996) require organizations to retain data up to six years. This six year requirement may be longer than an organization is able to retain a hardware snapshot or may be even longer than an organization retains the storage device.

(2)—Hardware snapshots may be dependent on production data. It is presumed that snapshots are recoverable even if data loss on a production file system occurs. However, if the production file system becomes corrupted, any snapshots that reference the file system may become useless as they may only reference changed blocks rather than all blocks.

(3)—Snapshots may be tied to storage. Hardware snapshots may reside on the same disks as production data and may reference the same data. If the production storage system goes offline for any reason, e.g., catastrophic hardware failure, power outage, etc., hardware snapshots may be lost in addition to the storage.

(4)—Storage dependency. Hardware snapshots may be tied to a particular storage. Thus it may only be possible to restore a hardware snapshot to a same storage that it is located on, or a mirrored storage. However, conventionally it is not possible to take a hardware snapshot from one vendor's storage and restore the hardware snapshot to another vendor's storage.

(5)—Hardware snapshots are only suited for short retention periods. Hardware snapshot techniques, e.g., allocate-on-write, copy-on-write, split-mirror, etc., consume varying amounts of production disk storage capacity. While some hardware snapshot techniques consume far less storage than others, generally, they do not easily facilitate being retained over a long term due to the growing amount of disk space required by snapshots consumed over time. Furthermore, solid state drives (SSDs) further aggravate the cost of retaining hardware snapshots on production storage as they currently cost anywhere from two to ten times as much as hard disk drives.

(6)—Granularity. In some approaches, hardware snapshots may not be performed with granularity lower than a storage volume, often referred to as a logical unit number (LUN).

(7)—Hardware snapshots include "crash-consistent" state data. Storage does not typically include information regarding character of data stored on it such as an operating system, types of disks, types of applications, etc. in order to create a properly quiesced snapshot.

In order to address these limitations, various approaches have resulted in complex scenarios such as the following example:

(1) Application begins a backup job.

(2) Application communicates with a hypervisor to call a hypervisor specific application programming interface (API) in order to create a software snapshot.

(3) Application calls a storage API to create a hardware snapshot.

(4) The software snapshot is deleted.

(5) The hardware snapshot is promoted to a new LUN.

The LUN is mounted to a hypervisor host and is registered as a datastore in the hypervisor configuration.

(6) VMs from the hardware snapshot are registered on a host.

The application begins backing up the virtual machines data using any known technique of backing up VM images using the software snapshot.

(7) After the backup is completed, the application unregisters the datastore from the hypervisor and unmounts the hardware snapshot LUN.

(8) The hardware snapshot is deleted.

However, the above hardware snapshot scenario has a number of drawbacks: (1) Snapshot LUN is represented to the hypervisor host as a datastore. As a result, an additional hypervisor host may be required. However, in some situations, it may not be feasible to have an additional hypervisor host due to cost/resource considerations. (2) Mounting the hardware snapshot on the hypervisor host and registering it as a datastore may take a significant amount of time. Thus, significant time will be spent preparing the environment, and thus low recovery point objectives (RPOs) will not be attainable. (3) This hardware snapshot technique prevents use of some implementations of hypervisor-based changed block tracking (CBT) information, e.g., VMware vSphere CBT, because while registering the VM with a hypervisor host CBT data is reset. Thus, incremental backups may not be performed efficiently, and instead the entire VM image may need to be read during each backup rather than just reading blocks which have changed since a last run of the backup process.

The following example embodiments provide an efficient method and system for creating a VM backup using a hardware (storage) snapshot, according to embodiments. The following example embodiments are not limited to backup and may also be used for other data protection techniques such as replication, copying, etc.

According to example embodiments, a hypervisor host is not needed to mount hardware/storage snapshots for processing. Instead, the hardware snapshot is mounted directly to a backup server. As a result, this may reduce the cost of backup and increase performance of the backup by eliminating steps which were required in other approaches. In addition, according to the example embodiments, hypervisor-based CBT information e.g. VMware CBT, may be used in order to significantly increase speed and efficiency of block-level incremental backups.

Figure 1B:
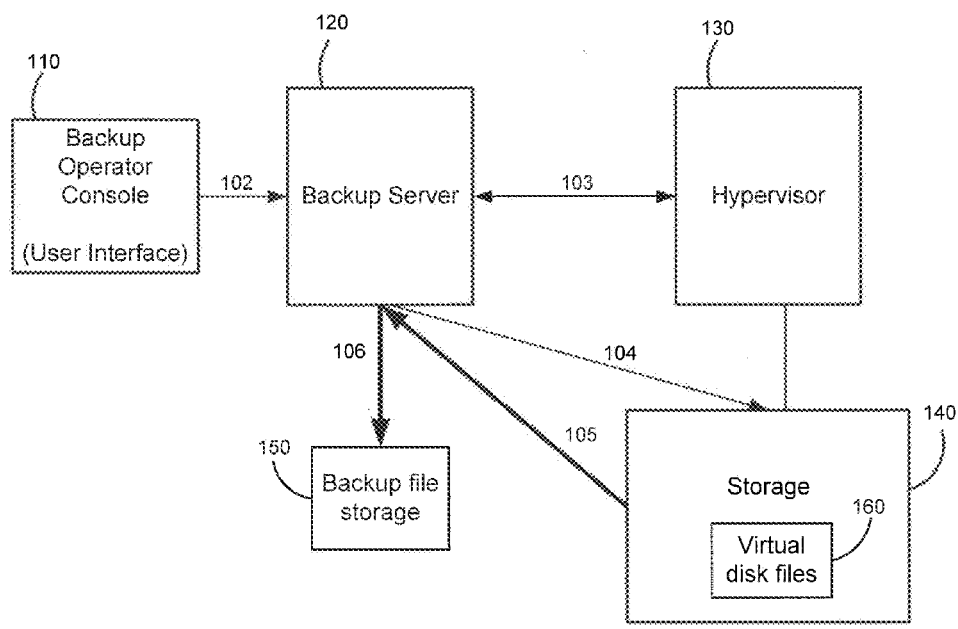
FIG. 1B is the block diagram shown in FIG. 1A further detailing the flow of connections between components in the VM system architecture, according to an example embodiment.

According to an example embodiment, FIG. 1A shows a block diagram of a VM system architecture 100 configured for VM backup using a storage snapshot, e.g., a hardware snapshot. FIG. 1B illustrates API calls as well as flow of VM disk data between modules comprising the VM system architecture 100.

According to an example embodiment, FIG. 1A illustrates a backup operator console 110, which may include a user interface to be used to select VMs to backup. Selection of the VMs to backup may be received by backup server 120. The backup server 120 may connect to hypervisor 130 using a hypervisor-specific API call to create a VM snapshot. Backup server 120 may establish a connection with hypervisor 130 and query an offset table in storage 140 which provides virtual disk file location information. This offset table indicates where data blocks of the virtual disk files 160 are located on storage 140. The offset table may include a plurality of entries which provide an offset and a length of each file block.

As a non-limiting example, for a Microsoft-based Hyper-V VM backup, an application may query new technology file system (NTFS) master file table (MFT) in order to obtain an offset table which indicates where virtual disks are located in physical storage. Using this information, the application may read virtual disk file data directly from the physical storage.

As a further non-limiting example, some hypervisors, e.g., VMware vSphere, implement native CBT mechanisms. For these hypervisors, CBT information may be retrieved from the hypervisor 130. The CBT information may be used in order to avoid reading virtual disk data that is known to have not changed since a previous backup cycle.

As a further non-limiting example, a VMware vSphere-based backup may provide CBT information by invoking a QueryChangedDiskAreas API query. QueryChangedDiskAreas may be called and returns a list of areas of a virtual disk which belong to an associated VM which may have been modified since a pre-defined point in time. A beginning of a change interval may be identified by "changeID" and an end of the change interval may be indicated by a current snapshot ID. "changeID" may be an identifier for a state of a virtual disk at a specific point in time.

Once the connection between backup server 120 and storage 140 is established, backup server 120 may then initiate hardware snapshot creation on storage 140. Backup server 120 may communicate with hypervisor 130 in order to delete the VM snapshot. According to an example embodiment, the VM snapshot may be deleted as soon as the hardware snapshot is created. In an example embodiment, the time between creation and deletion of the VM snapshot may be a few seconds. Backup server 120 may then promote the hardware snapshot to a LUN, mount the LUN to itself, and using the offset table obtained from the hypervisor, read necessary virtual disk file data blocks from the virtual disk files 160, process and write data to backup file storage 150.

FIG. 1B illustrates API calls as well as flow of virtual disk data within VM system architecture 100 according to an example embodiment. Thinner arrows represent API calls and thicker arrows (see 105 and 106 in FIG. 1B, and corresponding arrows in FIG. 1A) represent flow of virtual disk data. FIG. 1B illustrates communication within the system architecture, and in what order the communication occurs. Each of the arrows in FIG. 1B also represents a step of the VM backup process according to an example embodiment.

As shown in FIG. 1B, the arrow representing step 102 points unidirectionally from the backup operator console 110 to backup server 120. In this step 102, selective backup parameters are received by the backup server 120 from the backup operator console 110. These selective backup parameters may include one or more virtual machines to backup, etc.

Next, the arrow representing step 103 points bidirectionally between backup server 120 and hypervisor 130. In this step 103, the backup server 120 communicates with hypervisor 130 to call hypervisor specific API functionality in order to create/delete software snapshots, and also to obtain an offset table in addition to CBT data if it is available.

The arrow representing step 104 points unidirectionally from backup server 102 to storage 140. In this step 104, backup server 120 makes calls to storage 140 using a storage API to create/delete a storage snapshot. The backup server 120 may further promote the storage snapshot to a new LUN by issuing a corresponding API call against storage 140.

Next, the arrow representing step 105 points unidirectionally from storage 140 to backup server 120. In this step 105, the backup server 120 mounts the promoted storage snapshot to itself, backup server 120.

The arrow representing step 106 points unidirectionally from backup server 120 to backup file storage 150. In this step 106, the data in the virtual disk files 160 associated with the mounted storage snapshot is saved to the backup file storage 150.

Figure 2:
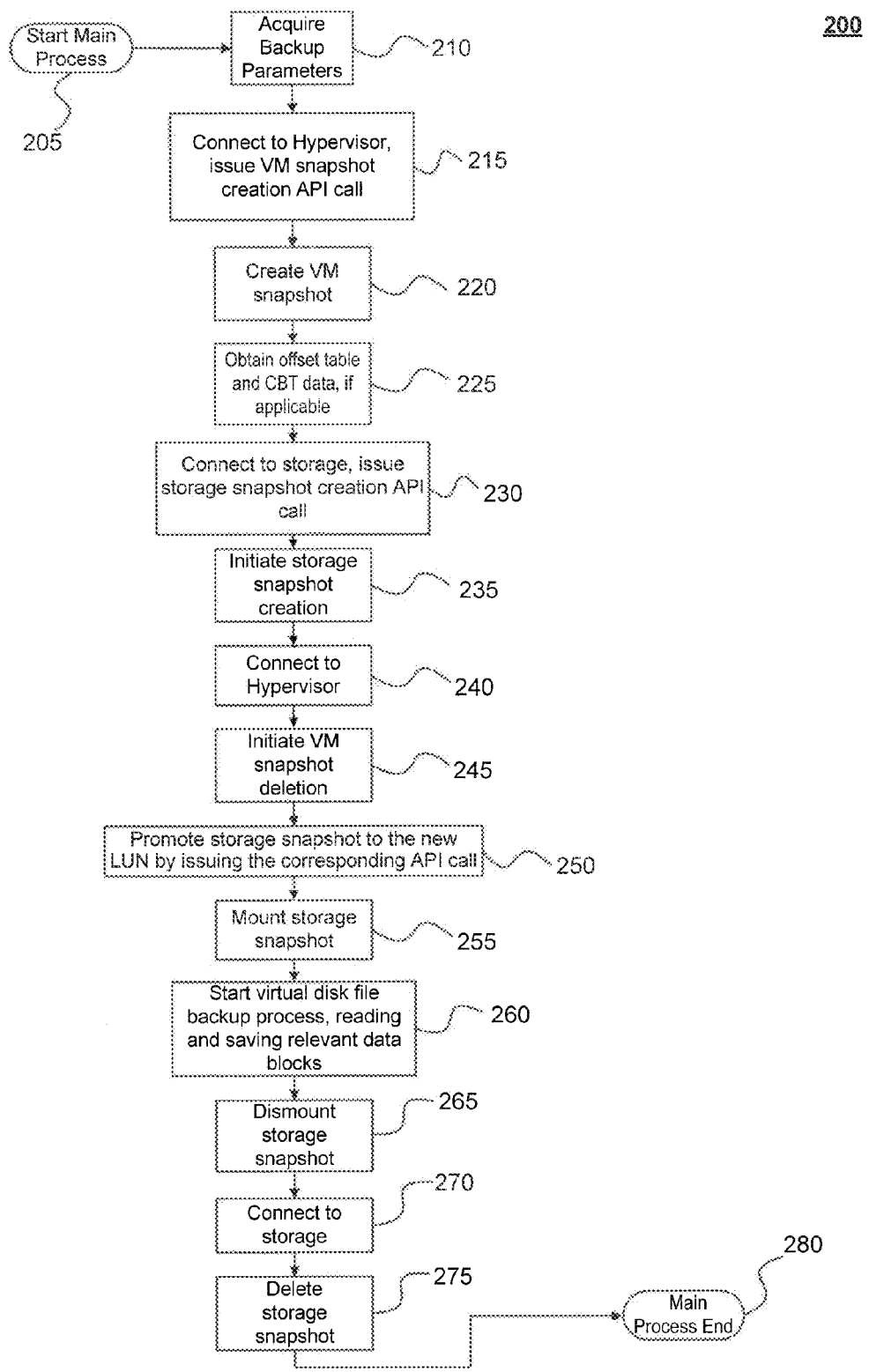
FIG. 2 is a flowchart illustrating a process for VM backup from a storage snapshot, according to an example embodiment.

According to example embodiments, FIG. 2 illustrates a process 200 for VM backup from a storage snapshot, according to an example embodiment. Solely for illustrative purposes, FIG. 2 is described with reference to the system shown in FIG. 1B. However, FIG. 2 is not limited to the example of FIG. 1B.

As shown in FIG. 2, the process begins at step 205. When the process begins in step 205, a backup application is started. After the backup application is started, the process proceeds to step 210.

In step 210, selective backup parameters are received by the backup server 120. The selective backup parameters may include at least one VM to backup, etc. After the selective backup parameters are received, the process proceeds to step 215.

In step 215, the backup server 120 connects to hypervisor 130 and issues a VM snapshot creation API call to the hypervisor 130.

After step 215, in step 220, the hypervisor 130 creates a VM snapshot.

After step 220, in step 225, backup server 120 obtains an offset table and if available, CBT data from the hypervisor 130.

After step 225, in step 230, backup server 120 connects to storage 140 and issues a storage snapshot creation API call.

After step 230, in step 235, storage 140 creates a storage snapshot.

After step 235, in step 240, backup server 120 connects to hypervisor 130.

After connecting to hypervisor 130 in step 240, in step 245, hypervisor 130 initiates VM snapshot deletion.

Next, in step 250, backup server 120 promotes the storage snapshot to a new LUN by issuing a corresponding API call against storage 140.

Next, in step 255, backup server 120 may then mount the promoted storage snapshot created in step 230 to itself.

Next, in step 260, backup server 120 uses the information received in step 225 to start a virtual disk file backup process by reading and saving relevant data blocks to backup storage 150 according to offset table and CBT data obtained earlier in the process.

After this backup process of step 260 is completed, the process moves to step 265. In step 265, backup server 120 dismounts the storage snapshot which was mounted to itself in step 255.

Next, in step 270, backup server 120 connects to storage 140. After connecting to storage 140, in step 275, backup server 120 issues a storage snapshot removal API call and storage 140 initiates storage snapshot deletion.

In step 280, the backup application is stopped and the process ends.

Example Computer System

Figure 3:
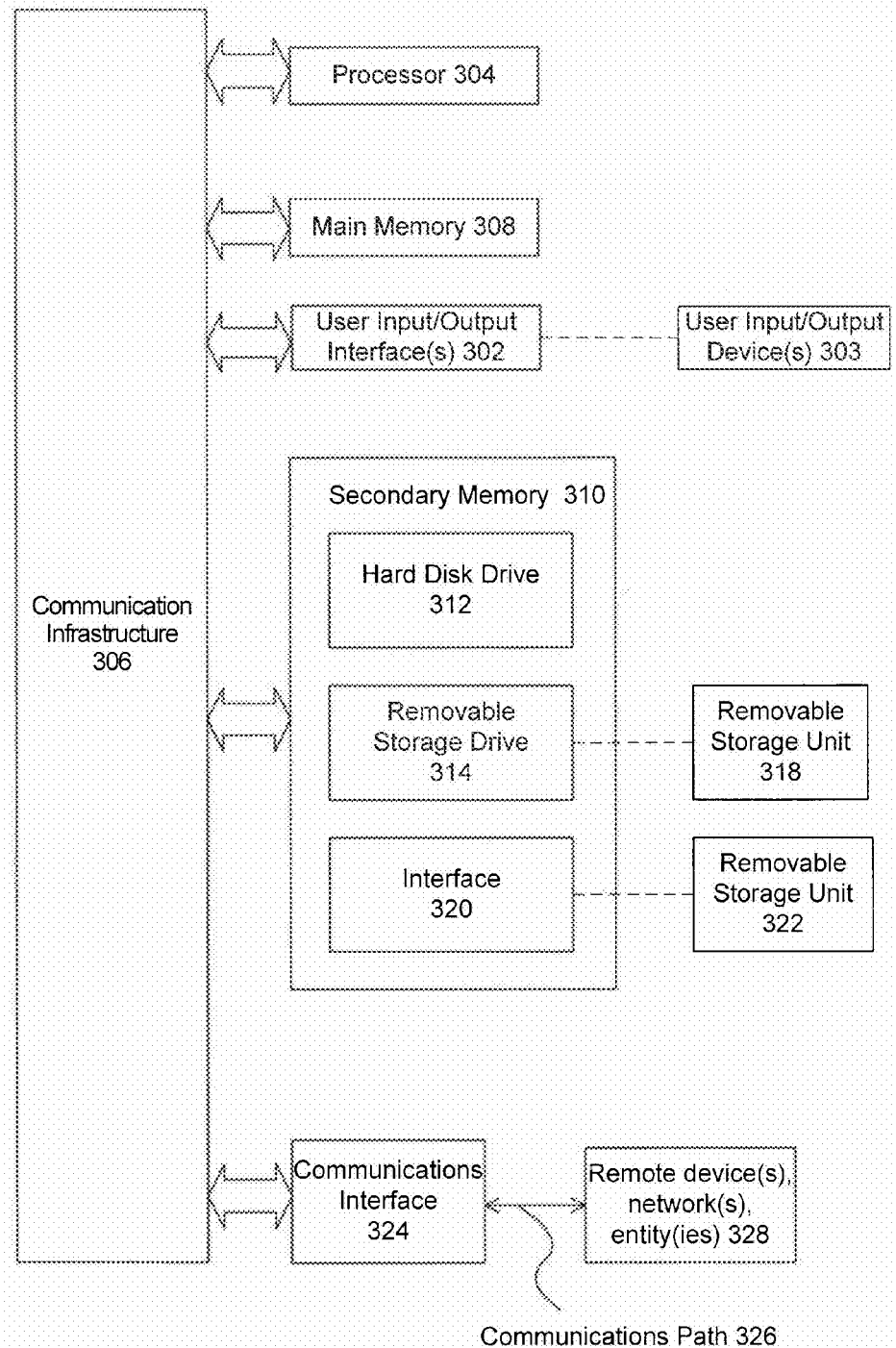
FIG. 3 is an example computer system useful for implementing various embodiments.

Various embodiments can be implemented, for example, using one or more well-known computer systems, such as computer system 300 shown in FIG. 3. Computer system 300 can be any well-known computer capable of performing the functions described herein, such as computers available from International Business Machines, Apple, Sun, HP, Dell, Sony, Toshiba, etc.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 300 also includes user input/output device(s) 303, such as monitors, keyboards, pointing devices, etc., which communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 3. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
  receiving, by at least one processor, selective backup parameters including an identifier of a virtual machine (VM) to backup;
  creating, by the at least one processor, a VM snapshot associated with the VM;
  retrieving, by the at least one processor, an offset table of data blocks associated with a virtual disk of the VM stored on a storage;
  creating, by the at least one processor, a storage snapshot on the storage;
  deleting, by the at least one processor, the VM snapshot;
  promoting, by the at least one processor, the storage snapshot to a logical unit number (LUN);
  mounting the promoted storage snapshot to a backup server;
  backing up, by the at least one processor, the data blocks to a backup storage using the offset table and the mounted storage snapshot; and
  dismounting from the backup server and deleting from the storage, by the at least one processor, the storage snapshot.

2. The method of claim 1, further comprising:
  determining a list of areas of the virtual disk that have been modified since a predetermined time.

3. The method of claim 2, further comprising:
  issuing an application programming interface (API) query to determine the list of areas of the virtual disk that have been modified since the predetermined time.

4. The method of claim 2, further comprising:
using the list of areas to back up only data blocks of the virtual disk that have been modified since the predetermined time to the backup storage.

5. The method of claim 1, further comprising:
issuing a VM snapshot API call to create the VM snapshot.

6. The method of claim 1, further comprising:
issuing a storage snapshot API call to generate the storage snapshot.

7. The method of claim 1, wherein the VM snapshot is deleted after the storage snapshot is created.

8. A system, comprising:
a memory; and
at least one processor coupled to the memory and configured to:
receive selective backup parameters including an identifier of a virtual machine (VM) to backup;
create a VM snapshot associated with the VM;
retrieve an offset table of data blocks associated with a virtual disk of the VM stored on a storage;
create a storage snapshot on the storage;
delete the VM snapshot;
promote the storage snapshot to a new logical unit number (LUN);
mount the promoted storage snapshot to a backup server;
back up the data blocks to a backup storage using the offset table and the mounted storage snapshot; and
dismount from the backup server and delete from the storage the storage snapshot.

9. The system of claim 8, the at least one processor further configured to:
determine a list of areas of the virtual disk that have been modified since a predetermined time.

10. The system of claim 9, the at least one processor further configured to:
issue an application programming interface (API) query to determine the list of areas of the virtual disk that have been modified since the predetermined time.

11. The system of claim 9, the at least one processor further configured to:
use the list of areas to back up only data blocks of the virtual disk that have been modified since the predetermined time to the backup storage.

12. The system of claim 8, the at least one processor further configured to:
issue a VM snapshot API call to create the VM snapshot.

13. The system of claim 8, the at least one processor further configured to:
issue a storage snapshot API call to generate the storage snapshot.

14. The system of claim 8, wherein the VM snapshot is deleted after the storage snapshot is created.

15. A tangible computer-readable device having instructions stored thereon that, when executed by at least one computing device, causes the at least one computing device to perform operations comprising:
receiving selective backup parameters including an identifier of a virtual machine (VM) to backup;
creating a VM snapshot associated with the VM;
retrieving an offset table of data blocks associated with a virtual disk of the VM stored on a storage;
creating a storage snapshot on the storage;
deleting the VM snapshot;
promoting the storage snapshot to a logical unit number (LUN);
mounting the promoted storage snapshot to a backup server;
backing up the data blocks to a backup storage using the offset table and the mounted storage snapshot; and
dismounting from the backup server and deleting from the storage the storage snapshot.

16. The computer-readable device of claim 15, the operations further comprising:
determining a list of areas of the virtual disk that have been modified since a predetermined time.

17. The computer-readable device of claim 16, the operations further comprising:
issuing an application programming interface (API) query to determine the list of areas of the virtual disk that have been modified since the predetermined time.

18. The computer-readable device of claim 16, the operations further comprising:
using the list of areas to back up only data blocks of the virtual disk that have been modified since the predetermined time to the backup storage.

19. The computer-readable device of claim 15, the operations further comprising:
issuing a VM snapshot API call to create the VM snapshot.

20. The computer-readable device of claim 15, the operations further comprising:
issuing a storage snapshot API call to generate the storage snapshot.

21. The computer-readable device of claim 15, wherein the VM snapshot is deleted after the storage snapshot is created.

* * * * *